United States Patent [19]
Avitan et al.

[11] Patent Number: 5,478,196
[45] Date of Patent: Dec. 26, 1995

[54] METHOD OF HANDLING STACKS OF BAKED GOODS TRAYS

[75] Inventors: Isaac Avitan; Lev M. Bolotin; Robert C. Weihe, all of Sioux City, Iowa

[73] Assignee: Schaeff, Incorporated, Sioux City, Iowa

[21] Appl. No.: 163,330

[22] Filed: Dec. 6, 1993

[51] Int. Cl.$^6$ .................... B66F 9/16; B60P 1/04
[52] U.S. Cl. .............. 414/786; 414/641; 414/642; 414/663
[58] Field of Search ................... 414/786, 641, 414/640, 642, 662, 663, 664, 668, 672, 551; 187/234, 237

[56] References Cited

U.S. PATENT DOCUMENTS

| | | | |
|---|---|---|---|
| 2,738,087 | 3/1956 | Arnot | 414/642 |
| 3,002,639 | 10/1961 | Cavanagh | 414/641 X |
| 3,532,239 | 10/1970 | May | 414/642 |
| 4,096,961 | 6/1978 | Rocco | 414/642 |
| 4,287,966 | 9/1981 | Frees | 187/234 X |
| 4,526,504 | 7/1985 | Hovey | 414/662 X |
| 5,215,427 | 6/1993 | Olsthoorn et al. | 414/668 X |

FOREIGN PATENT DOCUMENTS

| | | | |
|---|---|---|---|
| 0346292 | 12/1989 | European Pat. Off. | 414/642 |
| 3714849 | 9/1988 | Germany | 414/663 |
| 6710437 | 1/1968 | Netherlands | 414/664 |
| 2105678 | 3/1983 | United Kingdom | 414/640 |

OTHER PUBLICATIONS

Schaeff Incorporated, "Schaeff, The Smart Truck For The Long Run–Model FH50", Jan. 1993, 2 page brochure, Sioux City, Iowa.

Schaeff Incorporated, "Schaeff, The Smart Truck For The Long Run–Model E3", Jan. 1993, 2 page brochure, Sioux City Iowa.

Copyright 1992 Caterpillar, "Caterpillar—Versatile Walkies", Jun. 1992, 8 page brochure.

Primary Examiner—Michael S. Huppert
Assistant Examiner—Stephen Gordon
Attorney, Agent, or Firm—Zarley, McKee, Thomte, Voorhees, & Sease

[57] ABSTRACT

A method for handling conventional stacks of baked goods trays for the baking industry. A platen is moved underneath side-by-side stacks of trays. The platen supports the underside of the stacks of trays and prevents lateral movement of the bottom of the stacks by guiding the platen into channels that exist in the bottom of the trays. The platen is attached to an upright which is tiltable and which extends along one side of the baked goods trays when on the platen to support the stacks along their vertical height. Tilting of the upright causes the platen to lift and the trays to tilt against the upright where they are supported underneath and along the side and thus can be moved and handled. By utilizing the split platen and the tall tiltable upright with a motorized vehicle, an economical and efficient method of handing baked goods tray stacks is possible, eliminating significant manual labor and risk of worker injury.

6 Claims, 9 Drawing Sheets

METHOD OF HANDLING STACKS OF BAKED GOODS TRAYS

BACKGROUND OF THE INVENTION

A. Field of The Invention

The present invention relates to vehicles for transporting materials, and in particular, to vehicles especially suited for retrieving, transporting, and positioning stacks of relatively uniformly shaped trays or pallets, in particular, bread and other baked goods trays.

B. Problems In The Art

The production of baked goods is quite labor intensive. This includes the handling and storage of the baked goods at the baking facility, and the subsequent handling required to deliver the baked goods to end users. The distribution of bakery goods, including but not limited to bread loaves, buns, cakes, and donuts, is many times accomplished by shipping the items by semi-trailer trucks. Currently, this is done efficiently by placing the baked goods in relatively uniformly sized and shaped trays, such as are known in the art. The trays hold a plurality of baked items and are configured so that they can be matingly stacked upon one another without detrimentally affecting the baked goods.

The trays are various sizes but many are roughly on the order of approximately 27 inches by 22 inches in width and length, and from 3½ to 7 inches high at the corners (the highest points). A part of the tray, at the corners, extends below the platform which supports the baked goods.

The trays are usually stacked upon one another for efficient utilization of space at the bakery, in transit (in a semi-trailer for example), and then at the destination until the baked goods are moved to a store shelf or otherwise taken off the trays. The height of the stacks of trays is generally limited by practical considerations including the height of the room or building, the height of the semi-trailer, or the height that a human can lift a tray. Another consideration is the ability to move the stack or stacks, which, when loaded with baked goods, can each weigh several hundred pounds.

The handling of stacks of trays currently involves substantial manual labor. For example, hand-held manual carts, pallet jacks, or hand-dollies are used to engage and move a stack of trays. In all of these situations, the worker must exert substantial manual effort, including lifting, pulling, and maneuvering of the stacks, which can be unwieldy. Such manual labor not only involves substantial time and resources, but also involves the risk of injuries such as to the worker's back. Such risks extend beyond the worker to the employer in the form of risk of losing the availability of workers as well as the risk of workman's compensation claims, all of which translate into costs to the bakery, as well as to those that buy the products.

As can therefore be appreciated, the current state of the art in the bakery industry is for workers to handle loaded and unloaded baked goods trays by stacking them (involving much manual labor), but then manually manipulating the stacks to storage locations, into transportation vehicles, or otherwise. This simply takes a lot of time and effort, especially where substantial numbers of baked goods are being handled. The nature of baked goods is generally such that they must be distributed to the end user as soon as possible. The amount of lifting, pushing and pulling involved with these procedures presents a very real workplace concern regarding not only worker time and effort, but also worker injury, and resulting loss of the worker and worker compensation matters.

The requirement of significant amounts of manual labor effort and time can therefore be easily understood if trays are manually handled, for example when loading tens upon tens of trays into a semi-trailer for distribution to remote sites. Such expenditure of human resources can be a very costly endeavor for a company. The workers are limited, of course, as to how many trays can be handled at one time, in terms of the height and the ability to keep the stack intact.

Therefore, there is room for improvement as to the handling of baked goods trays. If a substantial savings in labor time and reduced injuries (such as back injuries) could be realized, it would be very beneficial with respect to the handling and distribution of baked goods. Obviously, bread and other baked goods are some of our staple food products. Large bakeries make and ship thousands of items per day. The items usually need to be distributed and consumed by the end user in a relatively short time period. Because bread, for example, is relatively low-priced, every efficiency and economy advance that can be achieved is advantageous.

One possible improvement might be the utilization of motorized vehicles to reduce labor time and risk of injury. There is currently no known vehicle that is suited for the task. To point out the lack of any viable solution, a short discussion follows regarding motorized vehicles known in other fields and why they would not effectively work for handling of baked goods trays.

Consider conventional lift trucks, such as are known in the art. An example is the Model E3 from Schaeff Incorporated. The narrow and spaced apart forks might be able to be moved underneath a stack of trays. However, the forks of such trucks are generally configured to handle pallets, which are wider than the trays. Also, although the mast of a lift truck can many times be vertically extended, the vertical support that moves with the forks is generally not too tall. Some lift trucks, like the Model E3, though, allow the forks and vertical support to be tilted forward and back. This can assist in stabilizing a load when moving. It should be understood that although lift trucks offer some advantages, they are an inefficient use because they are configured to allow relatively high lifting, which is not needed for baked goods tray stack moving. Therefore, a lift truck has many expensive features that would be under-utilized or not utilized. Furthermore, lift trucks are generally configured so that the operator is facing towards the lift in terms of layout of controls and the position of the operator. If moving stacks of baked goods trays, it would be very difficult for the operator to see through or around the trays. If the operator is forced to run the lift truck backwards, the operator must awkwardly turn around and this presents the risk of injury.

As can be understood in the art, lift trucks are generally designed to handle substantial loads of at least several thousand pounds. Additionally, they include components which can lift substantial loads to substantial heights. Therefore the structure of these machines is relatively complex and costly to manufacture. Additionally, maintenance on elevating parts, such as bearings, hydraulics, and hoses comes into play.

Consider next what are known in the art as walkies. Examples of such vehicles are the NPP60 (Walk), NPV60 (Walk and Ride), and NPC60 (Center-ride) Walkies. Other manufacturers make similar vehicles.

Walkies, for example, consist essentially of a relatively small motorized chassis with a control that could be operated by standing on-board or walking besides the vehicle. A fork (generally two elongated members) extends from the motorized portion. The forks can be moved between a position on the ground or floor, to one raised slightly off the ground or floor to allow the load to be lifted high enough so that it can be moved. Normally, there are no high backstops or supports, so that only stacks of trays of limited height, can safely be transported or great care and perhaps several workers must by hand support the stacks as they move. Walkies would allow placement of the stacks of bread trays on the forks behind the motorized portion and thus allow the operator a clear view of the path ahead. However, it would also require the manual placement of trays on the forks, which is counter productive. Walkies are also generally built to support and lift substantial loads; on the order of 3,000–5,000 pounds. Therefore, they are built with sufficient strength and durability to handle those loads, which contributes to the cost and complexity of the machines. Also, their long forks make them somewhat difficult to maneuver in tight spaces. They are designed mainly for low loads of substantial size and/or weight.

The use of walkies might increase the speed and ease of moving trays, but they still require some manual handling and are limited in the height of stacks that can be moved. For optimal efficiency, the amount of vehicle time utilized for specific tasks is important and valuable. Minimization of vehicle use time is therefore another significant economic consideration.

Consider a still further different type of motorized vehicle recently developed specifically for the furniture industry. Schaeff, Incorporated has developed a different kind of materials transport vehicle that merges some of the advantages of the walkies and some of the advantages of the lift truck. It is available under product number FH 50 and is called a Stand-up Electric Materials Transport Vehicle. It has an motorized portion where the operator can stand up and drive, and face away from the load it is moving. It is considered a relatively light duty vehicle, having a load rating of around 500 pounds. It does not utilize any elevating components but rather relies on a tiltable rack with a platen at the bottom that can be used to place under a load. The rack is then tilted forward towards the vehicle to lift the platen off the ground and concurrently lift and tilt the load against an upright for transport. A relatively wide (but less than the width of the motorized portion) platen is used to slide under and then lift materials. A relatively tall upright and load backrest combination is pivotally attached to the motorized portion. The upright therefore can be moved between generally vertical, where the platen is essentially on the floor, to a tilted forward (towards the vehicle) position (approximately 20°), which raises the platen from the floor to allow movement of the vehicle and load. It also tilts the load back to the upright for stability and support.

The FH 50 was developed for a specific application, the movement of furniture. Most times furniture is shipped in boxes to protect it, and is not very heavy, but the size of furniture such as couches, davenports, dining tables, chairs, etc. makes such boxes cumbersome to handle. Therefore, the FH 50 can be made more economically than a lift truck, and even a walkie, because it can be built for loads of limited, relatively light weight and does not require elevating components. For example, the FH 50 has a 500 pound capacity, whereas the Model E3 lift truck has a 3000 pound capacity. This effects size, strength, materials, and many other factors in the design of the vehicle, all having a relationship to cost. The FH 50 also has a short wheel base, and the length of extension of the platen is relatively short so that the device can be easily maneuvered in small, confined spaces. One example would be the inside of a semi-trailer truck. It has a very short turning radius and its small wheel base allows it to be able to maneuver the relatively tall loads within tight areas.

Although the FH 50 has advantages in handling such things as furniture, it could not be optimally used for baked goods tray stacks. Its platen is narrower than the motorized portion (about 32 inches), so it cannot realistically handle more than one stack of the about 25 inch wide trays. Its upright is around 83 inches tall, but this is short of the height of semi-trailers (around 100 or more inches) so its support of stacks of bread trays to that height is limited.

Therefore, although the FH 50 is available for other uses, it would not solve the needs in this area to the extent needed or desired. Therefore, although a device such as the FH 50 would have advantages over such things as fork lifts, walkies, and tow tractors, it would not be an efficient utilization of the motorized vehicle for the task of moving large numbers of stacks of bread trays, or the like.

It is therefore a principal object of the present invention to provide an apparatus and method of handling multiple baked goods trays which improve upon the state of the art.

Other objects of the invention are:

1. To allow efficient and economical handling of an increased number of trays per load.

2. To allow stacks of trays of substantial heights to be handled.

3. To allow one or two stacks of trays to be handled at one time.

4. To allow handling of such a quantity of trays but at the same time have good maneuverability in tight spaces, such as loading docks and semi-trailers.

5. To reduce the amount of manual handling and labor time in handling trays of substantial quantities.

6. To improve the stability of stacks of trays when moving the same.

7. To minimize the amount of personnel needed to handle the trays.

8. To automate as much as possible the handling of trays.

9. To reduce bodily injuries to workers.

10. To reduce workman's compensation claims associated with bodily injuries.

These and other objects, features, and advantages of the invention will become more apparent with reference to the specification and claims as follows.

SUMMARY OF THE INVENTION

The present invention is an apparatus and method for handling conventional baked goods trays. An automotive portion is driveable by a worker. An upright of substantial height is pivotable connected at the rear of the automotive portion. A mechanism can be actuated to tilt the top of the upright between generally vertical and several tens of degrees forward of vertical.

The upright has a platen connected at its bottom extending rearwardly therefrom. The platen may be wider than the width of the drive wheels of the automotive portion, and preferable is split into two separate sections. Each section is intentionally designed to be of a width to matingly fit between the legs of a baked goods tray, so that two stacks of trays can be picked up simultaneously.

The upright can be designed to have a height intentionally designed to correspond to conventional heights of distribution vehicles, such as semitrailers, and has a load backrest which is wide enough to support the width of two tray stacks.

The method according to the invention includes the steps of handling tray stacks by picking up two stacks of substantial height simultaneously with the split platen which mates into the space between the legs of the lowermost trays of the stacks, and then tilting the stacks and supporting the tops of the stacks while in transit, and maneuvering the two stacks in tight spaces.

Other features and options of the invention are set forth in other parts of this specification.

DETAILED DESCRIPTION OF THE INVENTION

A. Overview

Figure 1:
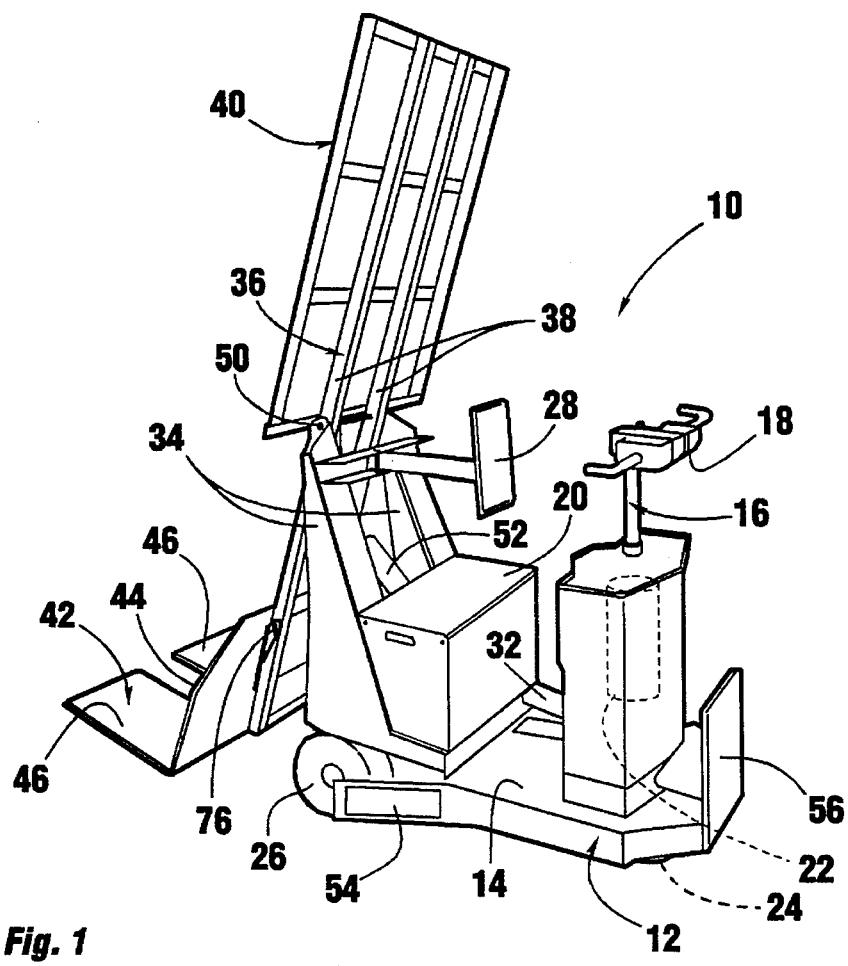
FIG. 1 is a perspective view of a preferred embodiment of an apparatus according to the present invention.

To provide a better understanding of the invention, one specific embodiment will now be described in detail. The description will refer frequently to the accompanying drawings. Reference numerals and letters will be used to indicate certain parts and locations in the drawings. The same reference numerals will be used to indicate the same parts and locations throughout the drawings, unless otherwise indicated.

The general structure of an apparatus according to the preferred embodiment will be first set forth, followed by a description of the use and operation of the apparatus. Some options, features, and alternatives will be described.

B. The Apparatus Generally

FIG. 1 depicts an apparatus (herein described as vehicle 10), according to a preferred embodiment of the invention. Vehicle 10 is considered to be a relatively light duty vehicle having generally a 500 pound capacity, or a capacity on that order. It is an electrically powered vehicle of relatively small dimensions, short wheel base, and small turning radius, and does not have any elevating components.

It operates by being highly mobile and maneuverable with that load capacity. It utilizes a tilting rack that includes a platen which supports the underside of the load and a large upright to support one side of the load vertically.

Vehicle 10 has similarities to the Schaeff, Incorporated FH 50 previously mentioned but has a variety of modifications and redesigns so that it can effectively, efficiently, and economically be utilized for baked goods tray stack moving. Therefore, some specific details regarding some of the basic configuration of the vehicle will not be described here, and reference can be taken to the technical literature regarding the FH 50 for those details.

C. The Apparatus Specifically

By referring to FIG. 1, the specific configuration of vehicle 10 will discussed. A housing or chassis 12 (referring generally to all but the tilting rack of vehicle 10) includes an operator platform 14. The operator stands on this surface and faces towards steering control 16. Platform 14 is a walk-through platform to allow the operator quick and easy access from either side of the vehicle which increases productivity. The operator also has good vision of the path ahead (at least 180° vision) and is not hindered by having to look through or around the load being carried by vehicle 10. Steering control 16 includes operational controls 18, such as are known in the art. For example, steering control 16 (including a T-shaped steering bar) includes forward, reverse, and speed controls 18.

The electrical battery or batteries 20 which power the vehicle are positioned on the chassis 12 behind the operator platform 14. It is to be understood that vehicle 10 utilizes front wheel 24 as the drive wheel and a suitable electric motor (see 22) is positioned in the chassis' housing 12 adjacent to front wheel 24. Electrical power from battery 20 is supplied to motor 22 through chassis 12, such as is known in the art. Rear wheels 26 (one visible in FIG. 1) are not driven but are spaced apart sufficiently to give stability to vehicle 10. The batteries and motor/drive train are enclosed in housing 12 but are made easily accessible by removable panels.

Because vehicle 10 is configured for stand-up operation, which allows a more compact size, it is also provided with an operator backrest 28 (preferably padded). As is conventional in the art, what is called a deadman's pedal 32 exists on operator platform 14 requiring an operator to be standing on vehicle 10 and to press pedal 32 for the vehicle to operate. By positioning the operator in front of the battery, the tilting upright will not strike the standing operator.

The rear of vehicle 10 includes upwardly extending pivot arms 34 which terminate as pivotal supports for an upright 36. Reference numeral 50 indicates the pivot members (including pivot pins) which allow upright 36 to pivot on pivot arms 34. Upright 36 generally refers to the vertical portion of a tiltable rack that supports the load to be handled by the vehicle, Upright 36 consists of two main beams 38. What will be called a load backrest 40 is positioned along the top portions of main beams 38. Load backrest 40 is of a width sufficient to support two side-by-side stacks of trays.

Towards the lower end of main beams 38 is positioned a platen 42. It consists of a vertical part 44 and a split horizontal part 46. Vertical part 44 is pivotally connected at its upper edge by pivot ears 76 and pins to main beams 38 of upright 36. It could also be non-pivotally connected to upright 36. FIG. 1 also shows a hydraulic tilt cylinder 52 such as known in the art. Cylinder 52 is connected between chassis 12 and upright 36. By actuating cylinder 52, it extends and retracts to pivot or tilt the entire rack comprised of upright 36 and platen 42, as will be discussed in more detail later.

FIG. 1 also shows that what are called deflectors or kick outs 54 are positioned along the sides of vehicle 10 near wheels 26. As will be further discussed below, platen 42 in this embodiment is of a width which is wider than the distance between wheels 26, and wider than the width of vehicle 10 at that location, to function effectively for the trays shown at FIGS. 6A–C. Deflectors 54 angle from the sides of chassis 12 outwardly and rearwardly to a width approximately equal to the outer edges of platen 42 to deter and repel anything from striking and catching on the lateral extensions of platen 42 (see FIG. 2).

FIG. 1 also shows a pusher pad 56 at the front of chassis 12, which would allow vehicle 10 to be used to push items. It can easily be appreciated that, alternatively or additionally, a hitch (not shown) could be provided to allow vehicle 10 to be a tractor or tugger.

Figure 2:
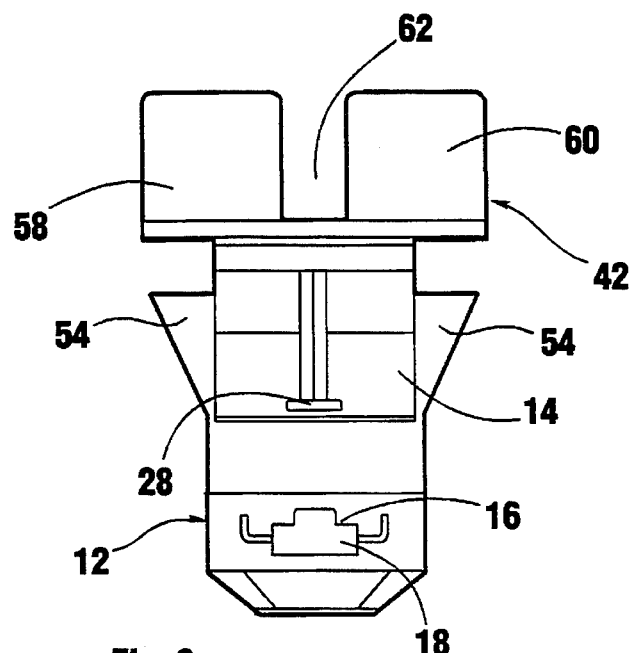
FIG. 2 is a top plan view of FIG. 1.

FIG. 2 is a top plan view of vehicle 10. It provides a better understanding of the size and shape of the platen 42 and its relationship to chassis 12. Note also deflectors 54.

FIG. 2 shows that platen 42 is split between a left fork or plate 58 and a right fork or plate 60, separated by a gap 62. As will be discussed further, the combined width of plates 58, 60 and gap 62 can be wider than chassis 12 to enable the platen 42 to simultaneously pick up and move two stacks of bread trays, if the trays side by side are wider than chassis 12. The ultimate width of platen 42, and individual forks 58 and 60 can vary, as can the width of gap 62, so that the platen 42 can be specifically correlated to a variety of tray types and sizes. Platen 42 can be interchangeable so that the user can have available different platen options.

Figure 3A:
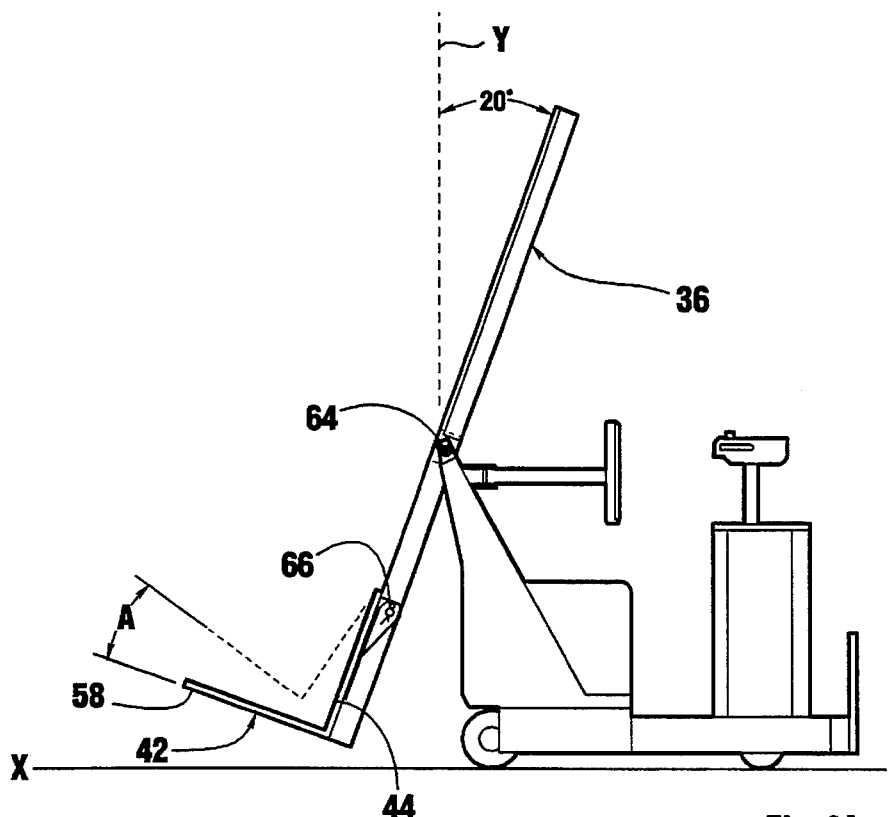
FIG. 3A is a side elevation view of FIG. 1 and showing the forward (toward the front of the vehicle) tilting of the top of the tilting rack, consisting of an upright and platen, and the ability of the platen to pivot away from the upright.

FIGS. 3A and B diagramatically depict the pivotability of upright 36 and platen 42. The pivot axes for upright 36 relative to pivot arms 34 of chassis 12, and platen 42 relative to upright 36 are denominated as pivot axes 64 and 66 respectively. Upright 36 can be pivoted to approximately 20° forward (from vertical axis Y toward the front of the vehicle) as shown in FIG. 3A. Platen 42 can swing away from upright 36 around axis 66. Normally vertical part 44 of platen 42 rests against the bottom portion of upright 36, maintaining the forks or plates 58 and 60 of platen 42 generally perpendicular to the longitudinal axis of upright 36. As can be easily appreciated, the forward (towards the vehicle) tilting of upright 36 lifts platen 42 off of the floor and would allow the vehicle to freely move.

FIG. 3A shows in ghost lines that platen 42 can pivot slightly away from upright 36 (see angle A), in the preferred embodiment, over a range around 0°–10° or more.

Figure 3B:
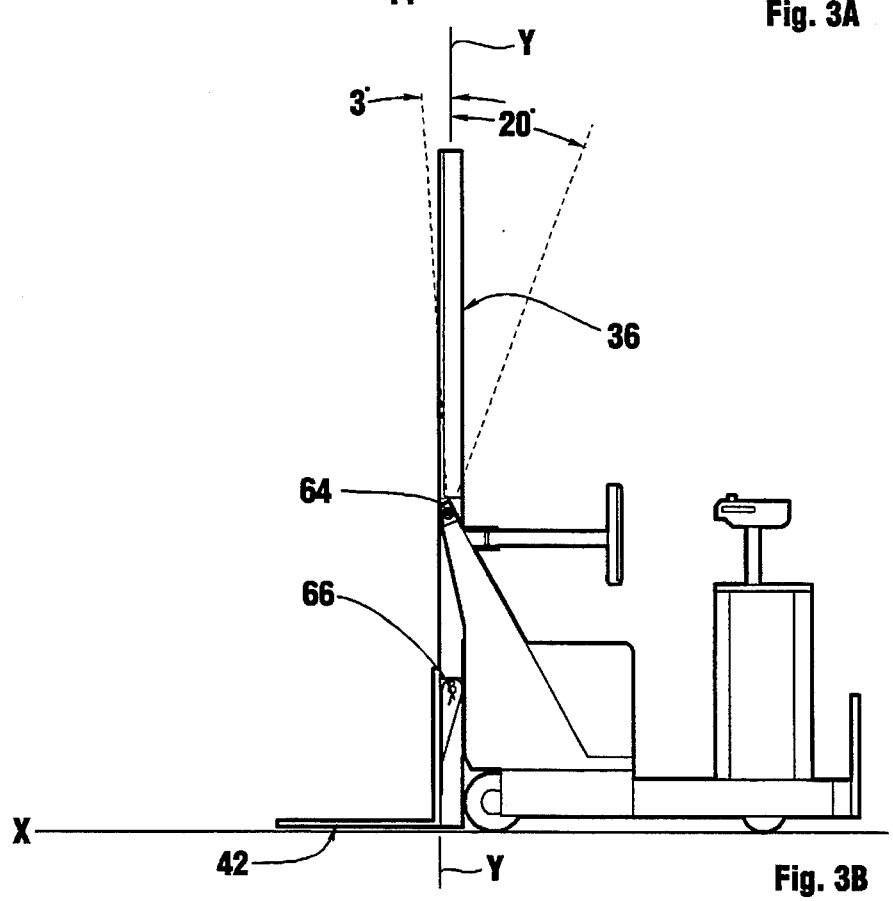
FIG. 3B is similar to FIG. 3A but shows the upright vertical and the range of pivotable movement of the upright.

FIG. 3B shows why such a relationship can be advantageous. When loading or releasing a load from vehicle 10, it is sometimes desirable for the upper part of upright 36 to be tilted rearwardly (away from the vertical Y-axis and away from the vehicle) slightly (here about 3°). As shown in 3B, the arrangement of pivots 64 and 66 is such that this 3° offset can be achieved.

Figure 4A:
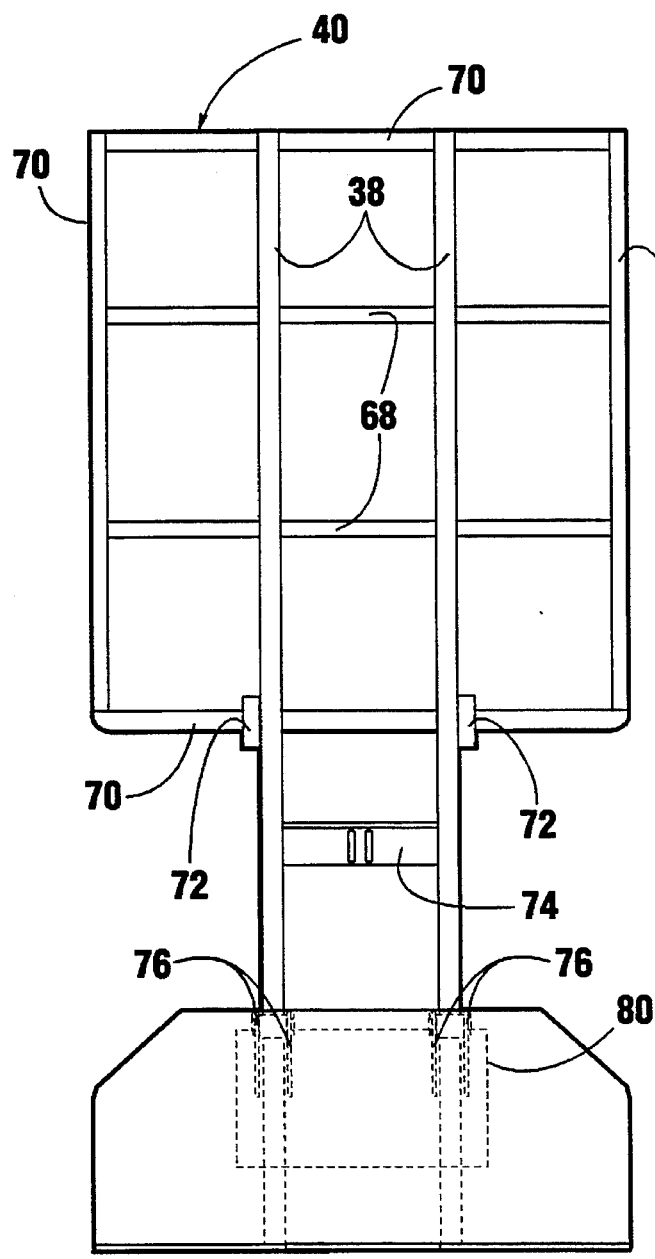
FIG. 4A is an isolated front elevation view of the upright and platen of the apparatus of FIG. 1.
Figure 4B:
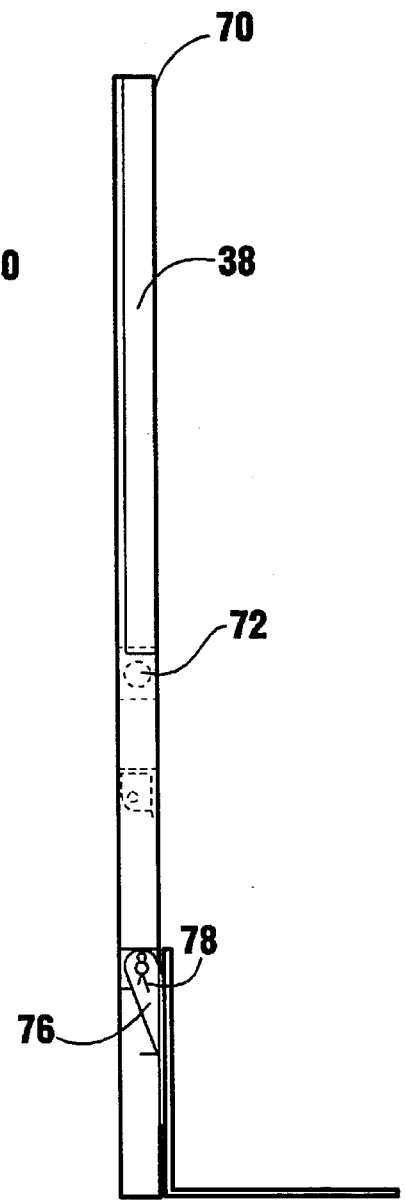
FIG. 4B is a side elevation view of FIG. 4A.

FIGS. 4A and B show in detail the rack of the apparatus. Main beams 38 are parallel and spaced apart, but are spaced a distance less than the width of chassis 12. Cross arms 68 and side rails 70 cooperate with the top approximately one-half of main beams 38 to provide what is called the load backrest 40 which in this embodiment is significantly wider than the distance between rails 38. The upright pivot connections, here shown at 72, are along main rails 38 at the lower edge of load backrest 40. A tilt cylinder connect plate 74 is connected between beams 38 below load backrest 40. Platen pivot ears 76 are positioned on pivot pins below connect plate 74. As seen in FIG. 4B, the platen pivot ears 76 are pinned into place by cotter-keys 78.

A platen connection plate (shown in ghost lines 80 in FIG. 4A) is rigidly connected to platen pivot ears 76, and allows connection of platen 42 itself by welding, bolts, or other means within the skill of those skilled in the art.

Figure 5:
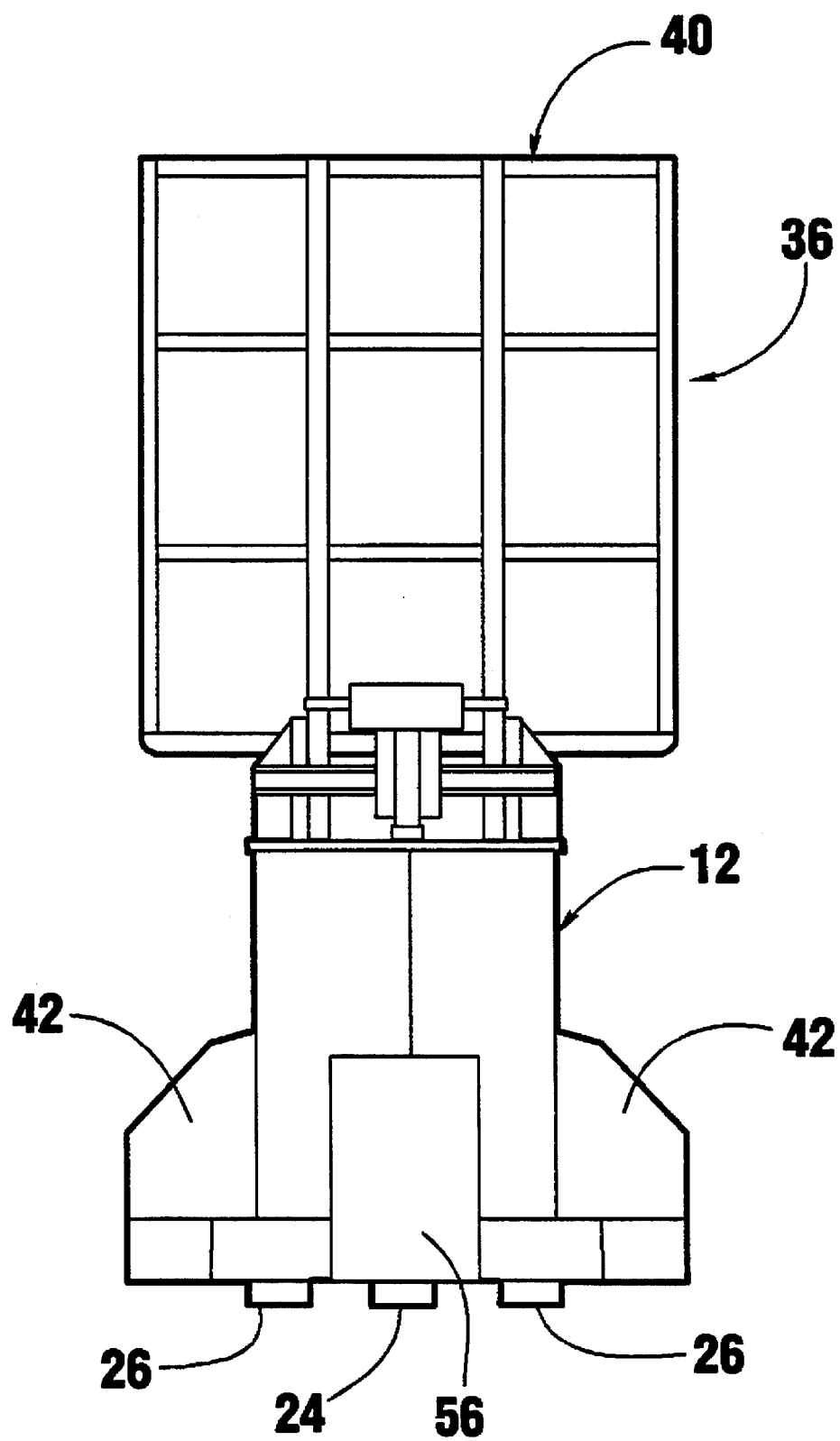
FIG. 5 is a front elevation view of FIG. 1.

FIG. 5 shows, in front elevational form, how platen 42 and load backrest 40 extend beyond the width of chassis 12 and the wheel base of vehicle 10 in this embodiment.

Figure 6A:
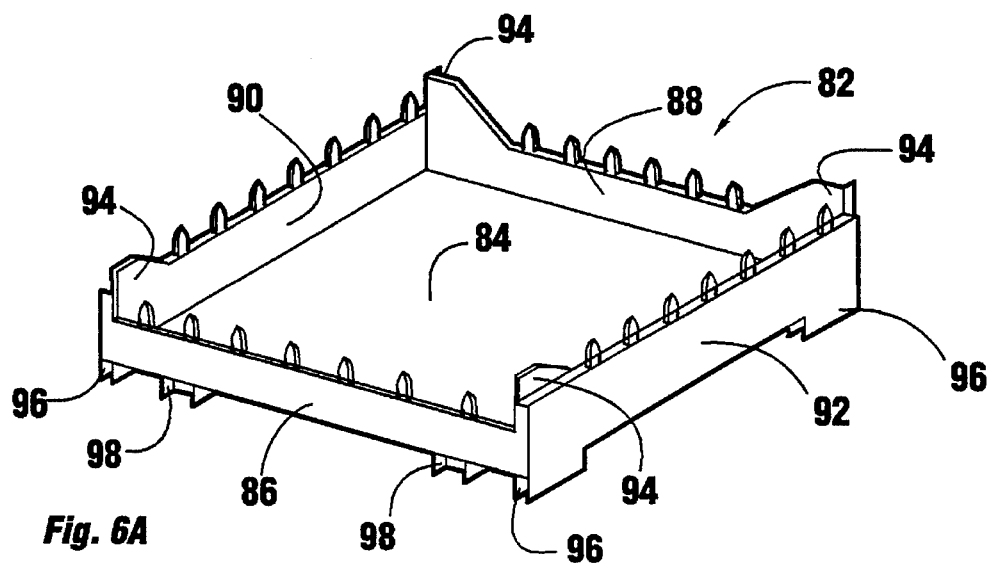
FIG. 6A is a perspective view of a conventional baked goods tray such as is handled according to the preferred embodiment of the present invention.
Figure 6B:
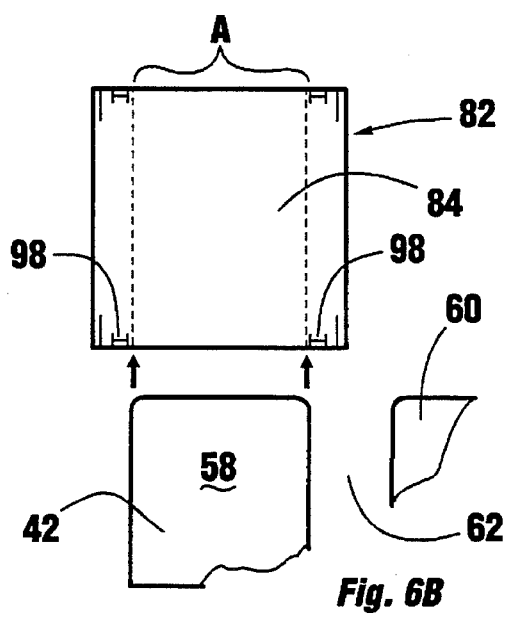
FIG. 6B is a reduced-in-size plan view of the tray of FIG. 6A, also showing how a platen engages a tray.
Figure 6C:
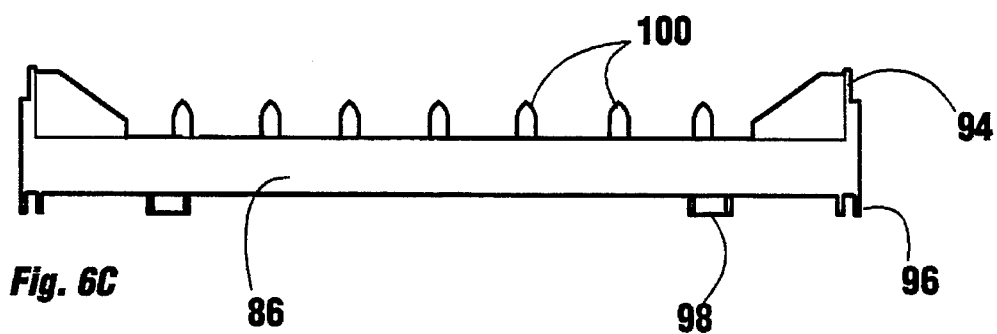
FIG. 6C is an enlarged front elevation view of the tray of FIG. 6A.

FIGS. 6A–C show in detail an example of a typical baked good tray 82. The trays are usually made out of plastic or material with similar properties (light weight, rigid and economical). Their major structural features are as follows. Loaves of bread or other baked goods are positioned on a rectangular support surface 84. The support surface 84 is framed by front wall 86, back wall 88, side wall 90, and side wall 92. Corner posts 94 extend upwardly whereas corner feet 96 extend downwardly. Additionally there are inner feet 98 which extend downwardly and define a channel between front and back walls 86 and 88. Fingers 100 (see FIG. 6C) also extend upwardly from the walls of tray 82 and serve to retain baked goods. As is well know in the art, the precise structure of trays 82 is such that when stacked, corner feet 96 of the tray above mate over corner posts 94 to give some interlocking between the trays in the stack.

FIG. 6B illustrates how left platen fork 58 can be inserted between inner feet 98 and extend underneath tray 82 (in the channel designated generally at A) to basically matingly lock into tray 82. Gap 62 between forks 58 and 60 is sized so that fork 60 could be inserted into the channel of a tray placed adjacent to tray 82 in FIG. 6B.

Trays 82 of FIGS. 6A–C have the following dimensions:

Front and back walls 86 and 88—25.88" in length.

Side walls 90 and 92—21.75" in length.

Distance between facing surfaces of inner feet 98—18".

It is to be understood, however, that the perimeter dimensions can vary, and the heights of trays can vary, usually from 3½ inches to 7 inches. In FIGS. 6A–C the tray has the following height:

Height of corner post 94—3.50".

Figure 7:
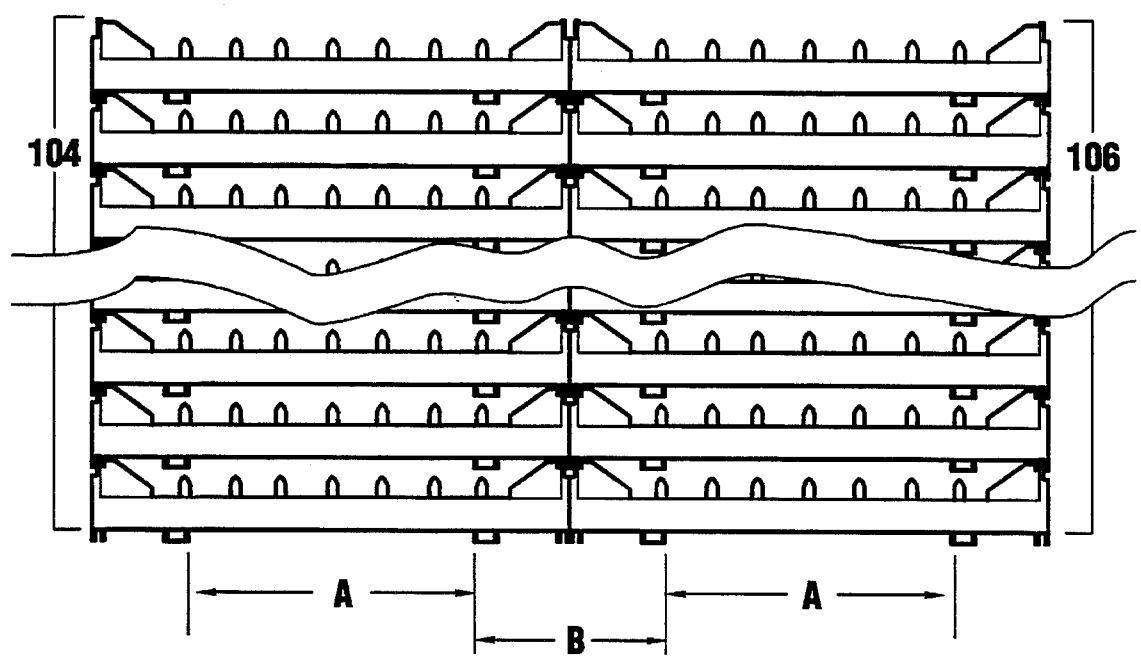
FIG. 7 is a front elevational depiction of the two side-by-side stacks of trays of the type of FIG. 6A.

FIG. 7 diagrammatically depicts first and second stacks 104 and 106. The channels through the lower-most trays of each stack 104 and 106 are indicated by reference letter A and are what left and right platen forks 58 and 60 would slide into and engage. Letter B would correspond to gap 62 in platen 42.

FIGS. 8–12 diagrammatically depict operation of the apparatus. The side elevational views of FIG. 8–11 show only left stack 104 of trays 82. However, it can be understood that the description is intended to cover the handling of both stacks 104 and 106.

Figure 8:
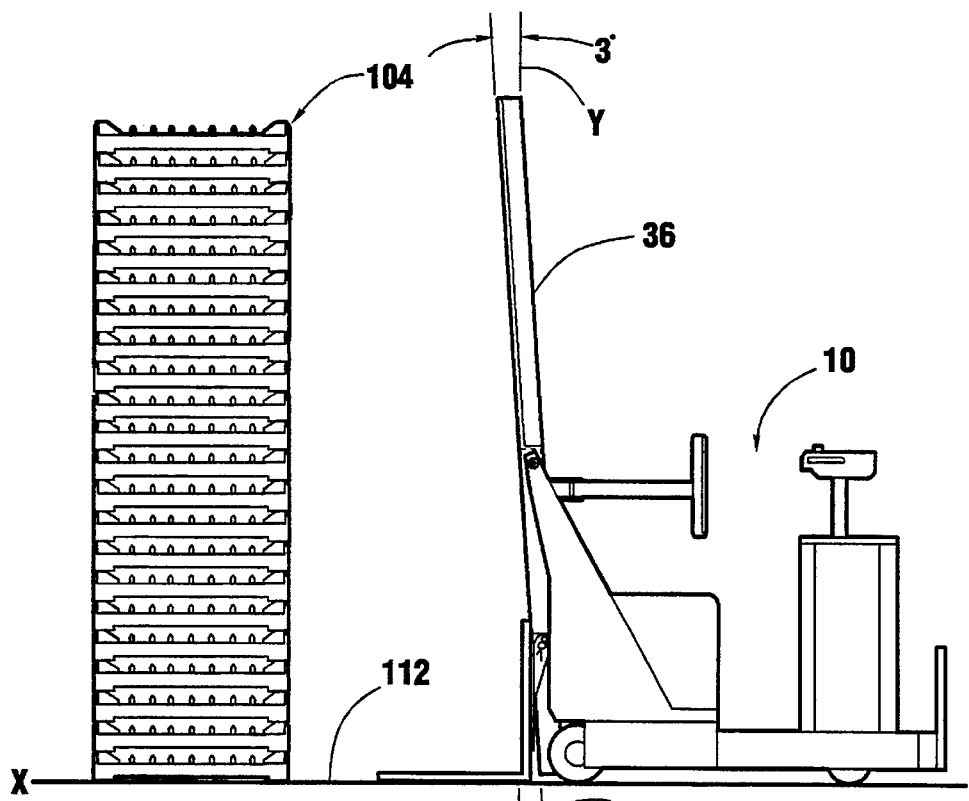
FIG. 8 is side elevation depiction of the embodiment of FIG. 1 moving up to the stacks of FIG. 7.

FIG. 8 shows that on the approach of vehicle 10 to stacks 104 and 106, if upright 36 is tilted rearward of vertical, platen 42 would remain essentially orthogonal to floor 112 by swinging away from the lower end of upright 36 by gravity. Platen forks 58 and 60 would then basically skid along the floor and, by mating them into the channels A in the lower trays of each stack, can engage the stacks.

Figure 9:
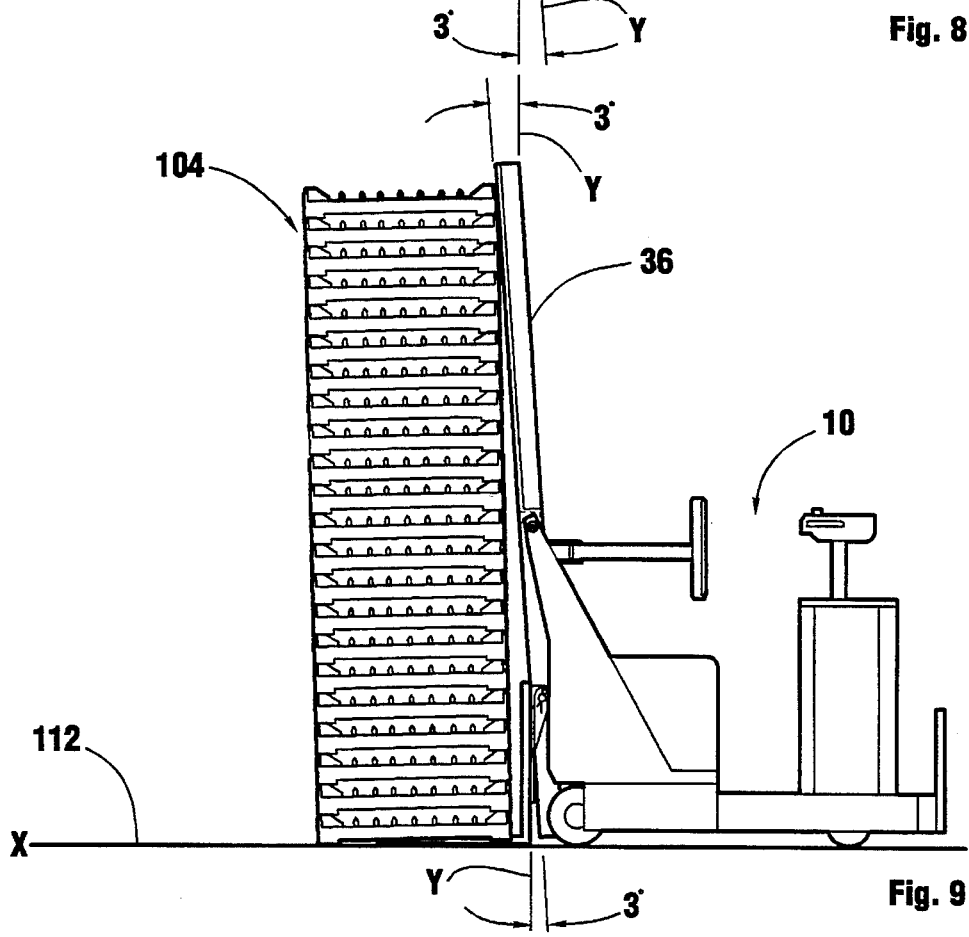
FIG. 9 is similar to FIG. 8 but showing the apparatus tilting the stacks forward to load them onto the platen.

FIG. 9 shows an advantageous feature of the slight rearward tilt of upright 36. The top end of 36 could abut the top of the tray stacks and rock the stacks slightly rearward (away from vehicle 10) to lift the nearest side of the stack slightly. It also ensures that the front ends of forks 58 and 60 are as low as possible to make engagement of forks 58 and 60 easier.

Figure 10:
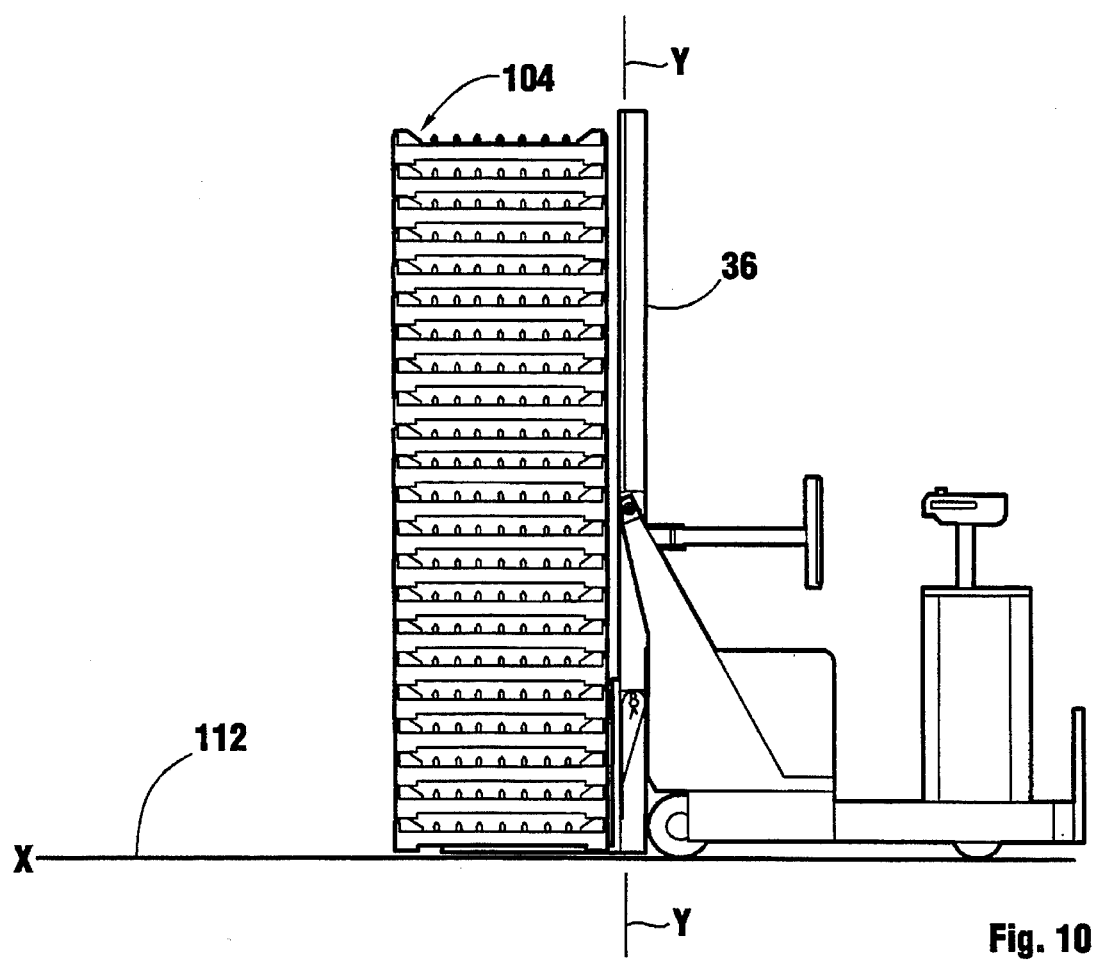
FIG. 10 is similar to FIG. 9 but shows the stacks loaded onto the platen.

FIG. 10 then shows that upright 36 would be pulled forward (towards the front of the vehicle) to vertical alignment and the stacks would be engaged so that their sides facing upright 36 would abut upright 36, platen 42, and back rest 40.

Figure 11:
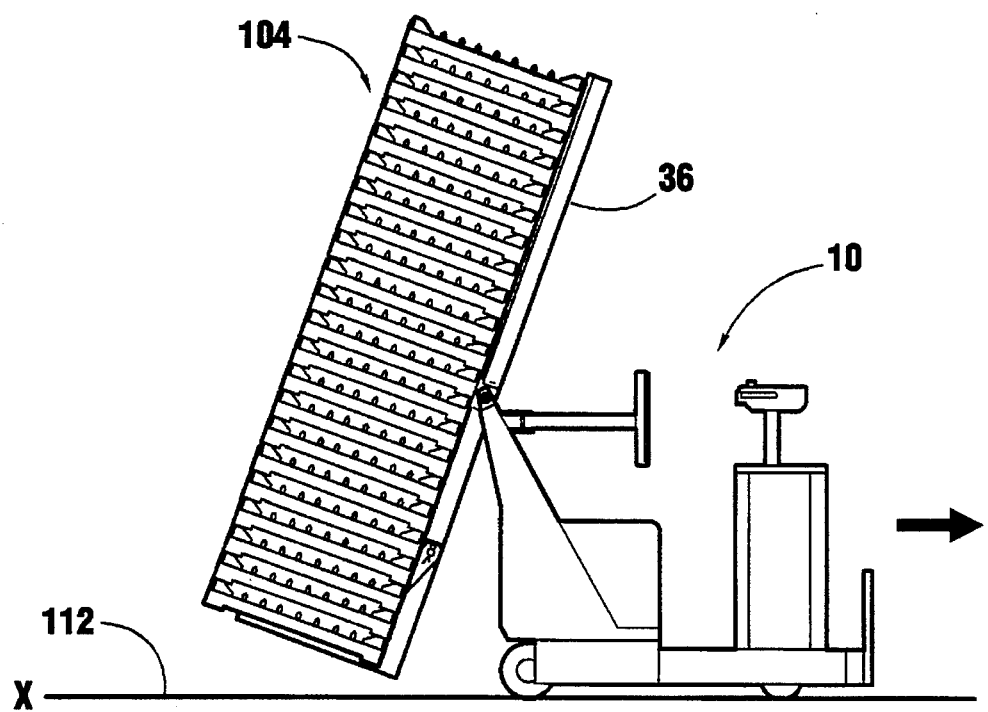
FIG. 11 is similar to FIG. 10 but shows the upright tilted forward and the platen and stacks lifted off the floor to allow the apparatus to move the stacks.

The last step would then be to again actuate the tilt cylinder 52 to tilt upright 36 forwardly towards vehicle 10 (see FIG. 11). The stacks would also then tilt forward and rest in a cradle formed by platen 42, upright 36, and load back rest 40. Platen 42 would be raised clear of the floor to allow free movement of the entire vehicle 10 to another location.

By reversing the sequence of FIGS. 8–11, the load could be carried to a particular location (FIG. 11), upright 36 tilted to vertical (FIG. 10), upright 36 tilted rearwardly several degrees to tip the stacks back slightly (FIG. 9), and then vehicle 10 moved away from the stacks to remove and release platen 42 (FIG. 8).

Figure 12:
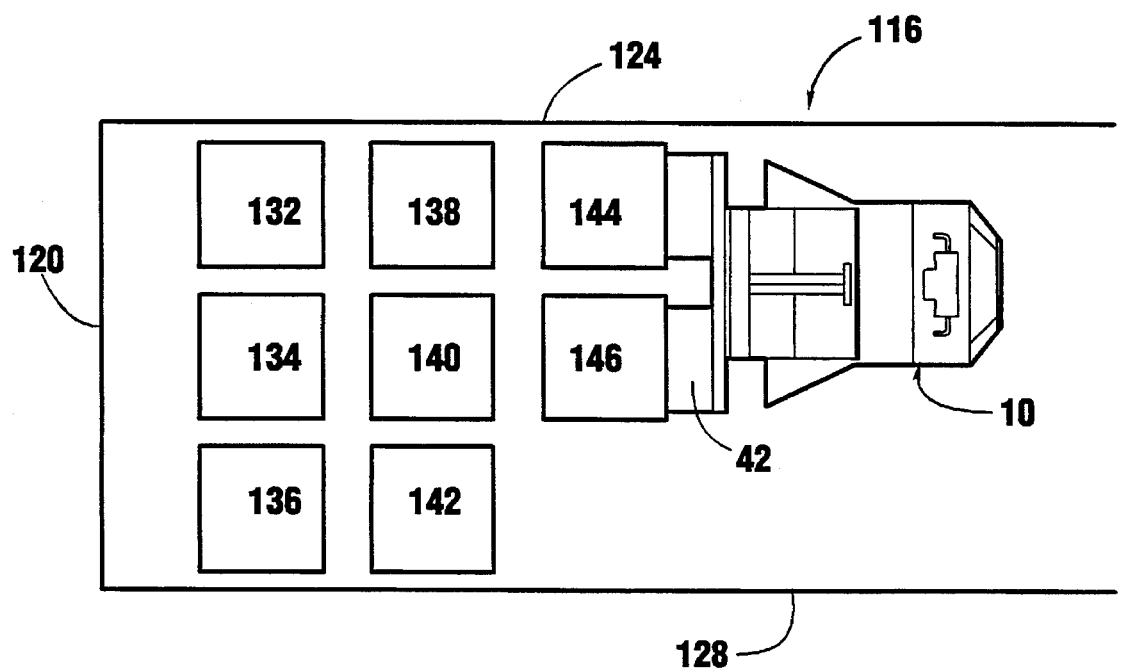
FIG. 12 is a top plan depiction of the interior of a semi-trailer, showing the efficient loading of tray stacks and the maneuverability of the vehicle.

FIG. 12 depicts the inside of a semi-trailer 116 by exposed top plan view. Stacks of trays are diagrammatically depicted by numbers 132, 134, 136, 138, 140, 142, 144, and 146. It shows that the vehicle 10 is of a size that can easily enter semi-trailer 116 and load or unload the tray stacks in a very efficient manner. In this example, the stacks can be distributed in the space defined by end wall 120 and side walls 124 and 128 of trailer 116 in an optimal configuration.

The apparatus therefore allows two tray stacks to simultaneously be engaged and cradled while being moved by motorized vehicle 10 which is highly maneuverable. The approximately 500 pound capacity and the requirement that it tilt the upright 36, rather than have any elevating function, allows the vehicle 10 to be designed to be much more economical than such things as lift trucks or walkies. The stand-up operation allows the dimensions of the vehicle to be very compact. Some salient specifications for vehicle 10 are set forth below:

Traction motor—class H insulated single 6.6" serial wound traction motor (3 h.p. with high starting torque power).

Load back rest—100.75" in length (main rails); 45.2" between lower end and pivot point on pivot arms; 42" wide; 20° tilt for transport; 3° opposite tilt.

Tilt motor—single 4.5" fan cooled class H insulated tilt pump motor for hydraulic tilt system.

Hydraulic system—integral reservoir operating pressure 1500 PSI, return line filter 10 micron full flow gear type tilt pump 2.5 G.P.M. at 1500 PSI.

Drive unit—enclosed planetary gear reduction drive unit flange mounted directly to traction motor. Mounting flange is integral with steering turret. Traction motor and gear reduction unit are mounted separate from battery compartment and are not subject to contamination.

Tires—drive steer tire is solid rubber 10"×3"×6.25"; two rear tires solid rubber 10"×4"× 6.5".

Brakes—automotive type cam operated 6" shoes-drum brakes hydraulic over mechanical. Deadman brake engages when operator lifts foot/leaves vehicle.

Operator compartment height—35". Under-clearance—3".

Wheel base—37.5".

Length between front and rear of vehicle (to face of platen)—51.5".

Height of platen to upright pivot point—48".

Turning radius—48".

Battery compartment—31.5" (L). ×13.5" (W)× 25.0" (H).

The included preferred embodiment is given by way of example only and not by way of limitation to the invention which is solely described by the claims herein. Variations obvious to one skilled in the art will be included within the invention defined by the claims.

We claim:

1. A method of handling stacks of baked goods trays comprising:

engaging two stacks of trays, simultaneously underneath each stack in channels running through the bottom-most tray of each stack to obtain lateral stability of the bottom of the stacks, with a split platen on a tiltable upright connected to a motor source, the tiltable upright being in a generally vertical posture and having a top;

tilting the stacks against the upright, which extends substantially along an entire vertical side of the stacks of trays, by tilting the upright which concurrently lifts the platen while supporting the bottom-most tray of each stack to facilitate movement of the stacks;

operating a motive source to maneuver the stacks to desired locations;

moving the upright and stacks to a generally vertical posture; and removing the platen from underneath the stacks.

2. The method of claim 1 further comprising angling the upright relative to the top of the stacks when the upright is in the generally vertical posture so that the top of the upright abuts and tilts the stacks slightly away from the motive source to assist in engaging or removing the platen to or from underneath the stacks.

3. The method of claim 1 wherein the split platen comprises first and second generally coplanar portions having a width and length, the width and length of each portion engaging the channels in the bottom-most tray of each stack.

4. The method of claim 2 further comprising pivoting the platen slightly away from the upright when the upright is angled relative to the top of the stacks.

5. The method of claim 1 wherein the upright extends several feet above the platen, and pivots with respect to said motive source several feet above the platen.

6. A method of handling stacks of baked goods trays comprising:

engaging two stacks of trays, simultaneously underneath each stack in channels running through the bottom-most tray of each stack to obtain lateral stability of the bottom of the stacks, with a platen on a tiltable upright connected to a motor source, the tiltable upright being in a generally vertical posture and having a top;

tilting the stacks against the upright, which extends substantially along an entire vertical side of the stacks of trays, by tilting the upright which concurrently lifts the platen while supporting the bottom-most tray of each stack to facilitate movement of the stacks;

operating a motive source to maneuver the stacks to desired locations;

moving the upright and stacks to a generally vertical posture; and removing the platen from underneath the stacks;

further comprising angling the upright relative to the top of the stacks when the upright is in the generally vertical posture so that the top of the upright abuts and tilts the stacks slightly away from the motive source to assist in engaging or removing the platen to or from underneath the stacks.

* * * * *